United States Patent
Park et al.

(10) Patent No.: US 9,618,758 B2
(45) Date of Patent: Apr. 11, 2017

(54) STEREOSCOPIC IMAGE DISPLAY AND METHOD OF CONTROLLING BACKLIGHT THEREOF

(75) Inventors: Joonyoung Park, Gyeonggi-do (KR); Jaewoo Park, Gyeonggi-do (KR); Jeongki Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 1086 days.

(21) Appl. No.: 12/964,776

(22) Filed: Dec. 10, 2010

(65) Prior Publication Data

US 2012/0013601 A1    Jan. 19, 2012

(30) Foreign Application Priority Data

Jul. 14, 2010  (KR) .................. 10-2010-0067943

(51) Int. Cl.
*G09G 3/36* (2006.01)
*G02B 27/22* (2006.01)
(Continued)

(52) U.S. Cl.
CPC ......... *G02B 27/2264* (2013.01); *G09G 3/003* (2013.01); *G09G 3/3426* (2013.01);
(Continued)

(58) Field of Classification Search
CPC ..... G02B 27/2264; G09G 3/003; G09G 3/342
(Continued)

(56) References Cited

U.S. PATENT DOCUMENTS 8,339,444 B2   12/2012  Schultz et al.
8,675,053 B2   3/2014   Lee
(Continued)

FOREIGN PATENT DOCUMENTS

CN   101494033      7/2009
JP   2009232249 A  10/2009
(Continued)

OTHER PUBLICATIONS

Chinese Office Action for Chinese Application No. 201010575293.8 dated Sep. 4, 2013.
(Continued)

*Primary Examiner* — Dennis Joseph
(74) *Attorney, Agent, or Firm* — Morgan, Lewis & Bockius LLP (57) ABSTRACT

A stereoscopic image display device comprises a frame rate conversion unit that divides 3D input data into left eye image data and right eye image data, inserts reset frame data containing black grayscale data between the left eye image data and the right eye image data, and generates the (n+1)-th frame data to the (n+4)-th frame data containing the left eye image data, the black grayscale data, the right eye image data, respectively, and the black grayscale data, a look-up table that stores local dimming values used to control brightness for the overall local dimming zones to the minimum during the (n+2)-th and (n+4)-th frame periods, and local dimming values used to control brightness for each local dimming zone to target brightness during the (n+1)-th and (n+3)-th frame periods, and a backlight controller that controls light source brightness of the backlight unit for each local dimming zone.

18 Claims, 10 Drawing Sheets

TB = 150

(51) Int. Cl.
*G09G 3/00* (2006.01)
*G09G 3/34* (2006.01)
*H04N 13/04* (2006.01)

(52) U.S. Cl.
CPC ..... *H04N 13/0438* (2013.01); *H04N 13/0497* (2013.01); *G09G 2340/0435* (2013.01); *G09G 2340/16* (2013.01)

(58) Field of Classification Search
USPC .................................................. 345/102, 690
See application file for complete search history.

(56) References Cited

U.S. PATENT DOCUMENTS

| | | | |
|---|---|---|---|
| 2007/0285366 A1* | 12/2007 | Ha | G09G 3/3648 345/87 |
| 2008/0246837 A1 | 10/2008 | Schultz et al. | |
| 2009/0009508 A1* | 1/2009 | Koo | H04N 13/0454 345/214 |
| 2009/0027488 A1 | 1/2009 | Lee | |
| 2009/0109247 A1* | 4/2009 | Kimura | 345/690 |
| 2009/0184917 A1 | 7/2009 | Park et al. | |
| 2009/0237495 A1* | 9/2009 | Kawahara | 348/56 |
| 2009/0289961 A1* | 11/2009 | Kim et al. | 345/690 |
| 2010/0066820 A1 | 3/2010 | Park et al. | |
| 2010/0079504 A1* | 4/2010 | Chen | 345/690 |
| 2010/0165222 A1 | 7/2010 | Choi | |
| 2010/0188439 A1* | 7/2010 | Sugimoto et al. | 345/690 |
| 2010/0289974 A1* | 11/2010 | Kim | G02B 27/2264 349/15 |
| 2012/0257027 A1 | 10/2012 | Kawahara | |
| 2013/0076710 A1 | 3/2013 | Schultz et al. | |

FOREIGN PATENT DOCUMENTS

| | | |
|---|---|---|
| KR | 20090011437 A | 2/2009 |
| KR | 20100014697 A | 2/2010 |
| KR | 20100076230 A | 7/2010 |

OTHER PUBLICATIONS

Korean Office Action dated May 16, 2016 for corresponding Korean patent application No. 10-2010-0067943.

* cited by examiner

FIG. 1

(RELATED ART)

FIG. 2A

(RELATED ART)

FIG. 2B

(RELATED ART)

FIG. 3

(RELATED ART)

STEREOSCOPIC IMAGE DISPLAY AND METHOD OF CONTROLLING BACKLIGHT THEREOF

This application claims the benefit of Korea Patent Application No. 10-2010-0067943 filed on Jul. 14, 2010, the entire contents of which is incorporated herein by reference for all purposes as if fully set forth herein.

BACKGROUND

Field

This document relates to a stereoscopic image display device and a method of controlling a backlight thereof.

Related Art

Image display devices are classified into a stereoscopic technique and an autostereoscopic technique.

The stereoscopic technique uses binocular parallax images which are great in the stereoscopic effect, and may have a type of using glasses and a type of not using glasses. In the type of using glasses, binocular parallax images are displayed on a direct view display panel or a projector by changing polarization directions or in the temporal division manner, and polarization glasses or liquid crystal shutter glasses are used to implement stereoscopic images. In the type of not using glasses, the stereoscopic images are implemented by dividing optical axes of binocular parallax images, by using optical plates such as parallax barriers provided at front and rear surfaces of a display panel.

Figure 1:
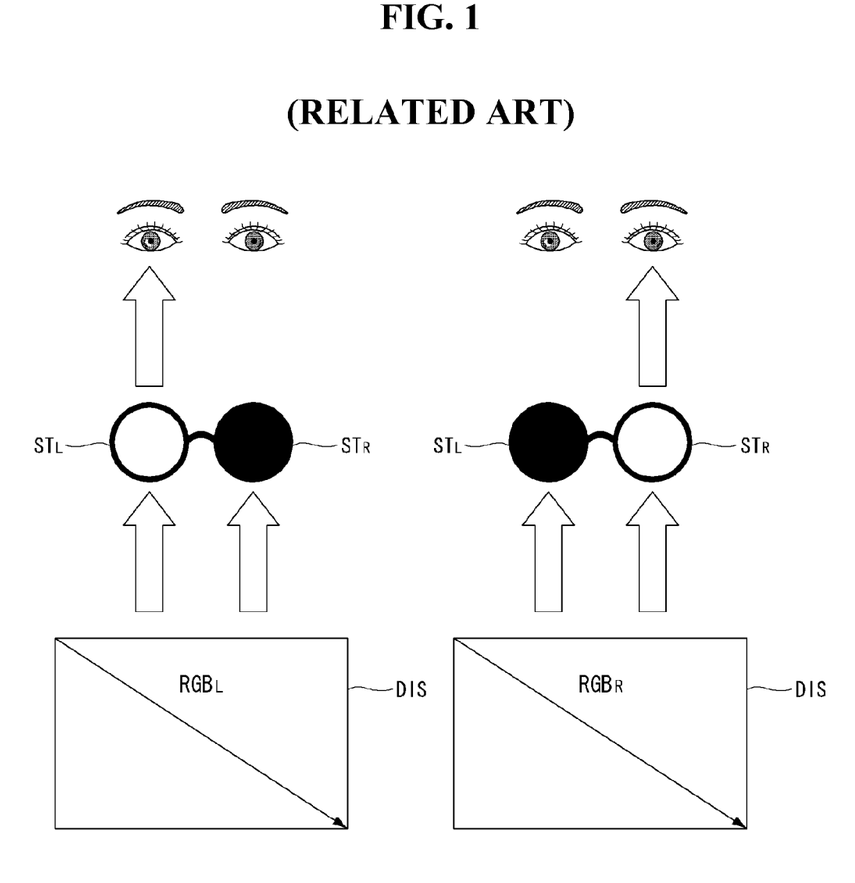
FIG. 1 is a diagram illustrating a temporal division operation of left and right images in a stereoscopic image display device of a glass type.

FIG. 1 is a schematic diagram illustrating an stereoscopic image display device of the glass type using shutter glasses. A black part of the shutter glasses is a closed shutter for blocking light directing toward a viewer and a white part thereof is an opened shutter for transmitting light directing toward the viewer. In FIG. 1, if a liquid crystal display is selected as a display device DIS, a backlight unit (BLU) providing light to the display device DIS is necessary.

Referring to FIG. 1, the left eye shutter STL of the shutter glasses ST is opened when left eye data RGBL is addressed in the display device DIS. The right eye shutter STR is opened when right eye image data RGBR is addressed in the display device DIS. Therefore, the viewer sees only the left eye image with the left eye and sees only the right eye image with the right eye, thereby obtaining a three-dimensional effect by a parallax.

Figure 2A:
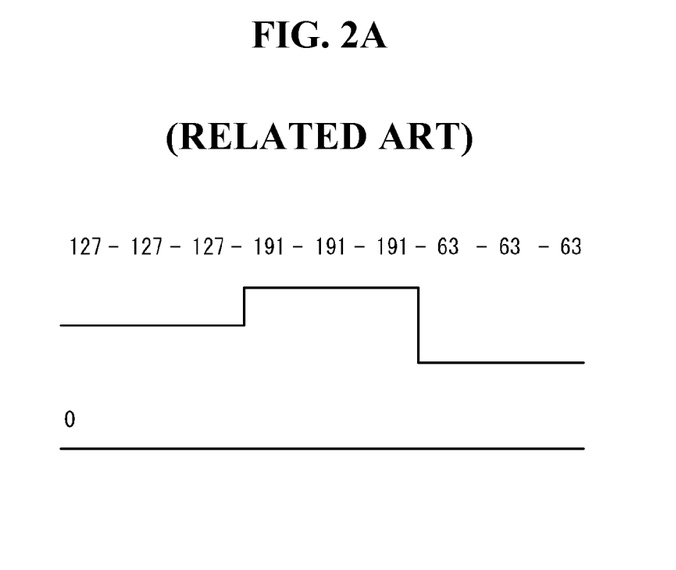
FIGS. 2A and 2B are diagrams illustrating an over-driving method for improving response characteristics of liquid crystal in displaying 2D images.
Figure 2B:
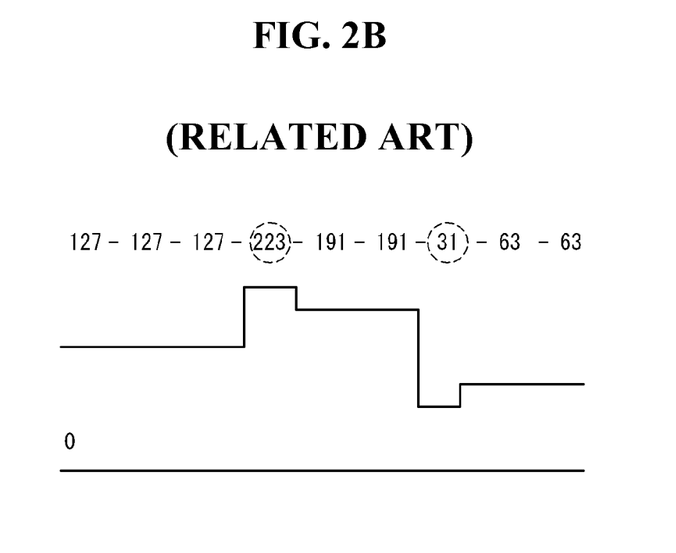

The liquid crystal display may include an over-driving logic circuit used to compensate the response speed of liquid crystal. The over-driving logic circuit increases a pixel data value for a current frame to a higher value if a pixel data value of an input image becomes larger in the current frame than in a previous frame, whereas it decreases a pixel data value for a current frame to a lower value if a pixel data value of the input image becomes smaller in the current frame than in a previous frame, thereby adjusting data voltages applied to liquid crystal cells to compensate a slow response characteristic of the liquid crystal. The over-driving logic circuit may be implemented by a look-up table where pixel data for previous and current frames of an input image is input and corresponding pre-stored modulation values are output. FIGS. 2A and 2B show an example of the over-driving method. If a pixel data value is increased from '127' to '191' as shown in FIG. 2A, the over-driving logic circuit increases the value '191' to a value '223' higher than that as shown in FIG. 2B. In addition, if the pixel data value is decreased from '191' to '63' as shown in FIG. 2A, the over-driving logic circuit decreases the value '63' to a value '31' lower than that as shown in FIG. 2B.

Figure 3:
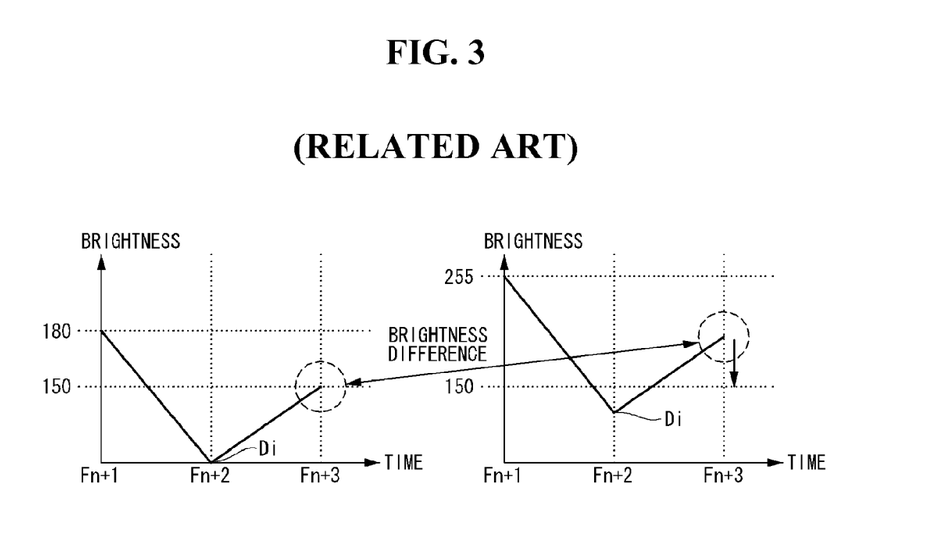
FIG. 3 is a diagram illustrating a cause of a 3D crosstalk when displaying stereoscopic images using a BDI.

In the stereoscopic image display device, it is possible to improve an image tailing by reducing a 3D crosstalk and a motion blurring through a BDI (black data insertion). In this method, as shown in FIG. 3, during a (n+1)-th (where n is a positive integer) frame period Fn+1, left eye (or right eye) image data is addressed in the display panel, during a (n+2)-th frame period Fn+2, black data having nothing to do with an input image is addressed in the display panel, and thereafter, during a (n+3)-th frame period Fn+3, right eye (or left eye) image data is addressed in the display panel. According to this method, the frame previous to the left eye image data frame and the right eye image data frame is a reset frame used to address black data, and thus it is difficult to improve the 3D crosstalk when the over-driving logic circuit used in the 2D image driving method in the related art is used in the 3D image display as it is. The 3D crosstalk means a degree that a left eye image and a right eye image overlap each other on one eye (the left eye or the right eye) of a user, and is defined by a ratio of black grayscale brightness to white grayscale brightness of one eye image. For example, when target brightness to be reached during the (n+1)-th frame period Fn+1, target brightness to be reached during the (n+2)-th frame period Fn+2, and target brightness to be reached during the (n+3)-th frame period Fn+3 are "180," "0," and "150," (as shown in the left part of FIG. 3) respectively, and "255," "0," and "150" (as shown in the right part of FIG. 3), respectively, the brightness is measured to be different during the (n+3)-th frame period Fn+3 although pixel data with the same grayscale value is addressed in the same pixels of the display device. This is because, as shown in the right part of FIG. 3, when the target brightness to be reached during the (n+1)-th frame period Fn+1 is "255", the brightness during the (n+2)-th frame period Fn+2 is increased to the brightness Di higher than the target brightness for the black grayscale data due to the response delay of the liquid crystal. As a result, as shown in the right part of FIG. 3, the brightness during the (n+3)-th frame period Fn+3 becomes higher than the target brightness of 150.

SUMMARY

Embodiments of this document provide a stereoscopic image display device and a method of controlling a backlight thereof capable of reducing a 3D crosstalk when displaying stereoscopic images using a BDI.

According to an exemplarily embodiment of this document, there is provided a stereoscopic image display device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the stereoscopic image display device include a liquid crystal display panel where frame data is addressed in an order of a (n+1)-th (where n is a positive integer) frame data to a (n+4)-th frame data; a backlight unit of which an emission surface is divided into local dimming zones which can be controlled in brightness and which provides light to the liquid crystal display panel; a frame rate conversion unit that divides 3D input data into left eye image data and right eye image data, inserts reset frame data containing black grayscale data between the left eye image data and the right eye image data, and thereby generates the (n+1)-th frame data containing the left eye image data, the (n+2)-th frame data containing the black grayscale data, the (n+3)-th frame data containing the right eye image data, and the (n+4)-th frame data containing the black grayscale data; a local dimming value selection unit that selects local dimming value used to control brightness for the overall local dimming zones to the minimum during the (n+2)-th and (n+4)-th frame periods, and local dimming values used to control brightness for each local dimming zone to target brightness for the left eye image data or the right eye image data during the (n+1)-th and (n+3)-th frame periods; a backlight controller that controls light source brightness of the backlight unit for each local dimming zone of the backlight unit, depending on the local dimming values output from the local dimming value selection unit.

In another aspect, a backlight control method of the stereoscopic image display device includes dividing 3D input data into left eye image data and right eye image data, inserting reset frame data containing black grayscale data between the left eye image data and the right eye image data, and thereby generating the (n+1)-th frame data containing the left eye image data, the (n+2)-th frame data containing the black grayscale data, the (n+3)-th frame data containing the right eye image data, and the (n+4)-th frame data containing the black grayscale data; controlling brightness for the overall local dimming zones to the minimum during the (n+2)-th and (n+4)-th frame periods; and controlling brightness for each local dimming zone to target brightness for the left eye image data or the right eye image data during the (n+1)-th and (n+3)-th frame periods.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Hereinafter, embodiments of this document will be described in detail with reference to the accompanying drawings. Like reference numerals designate like elements throughout the specification. In the following description, when a detailed description of well-known functions or configurations related to this document is determined to unnecessarily cloud a gist of the present invention, the detailed description thereof will be omitted.

Figure 4:
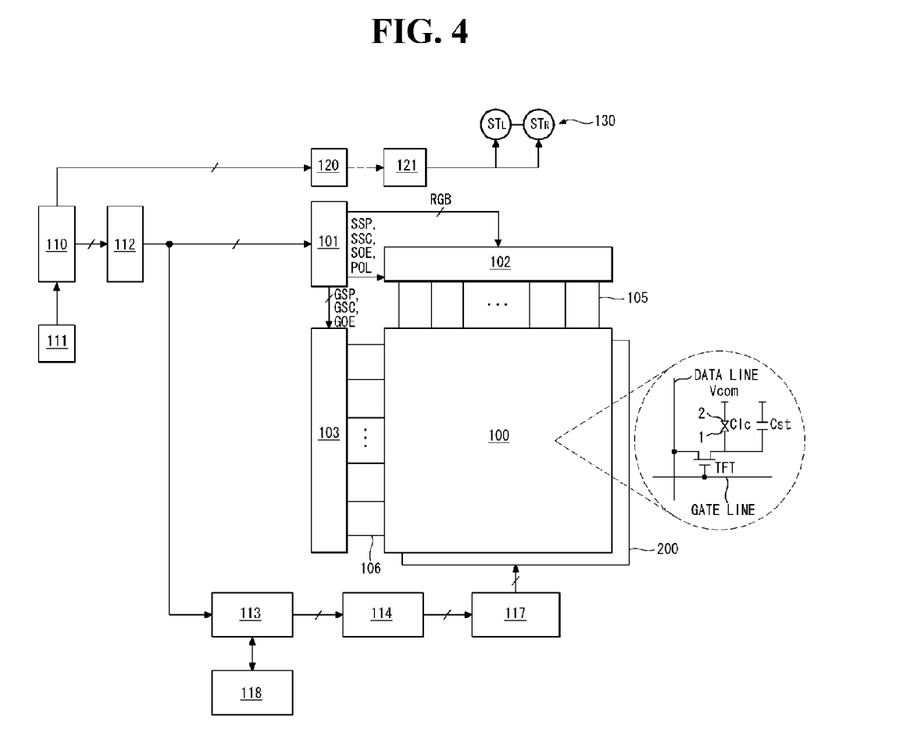
FIG. 4 is a block diagram illustrating an stereoscopic image display device according to an embodiment of this document.
Figure 5:
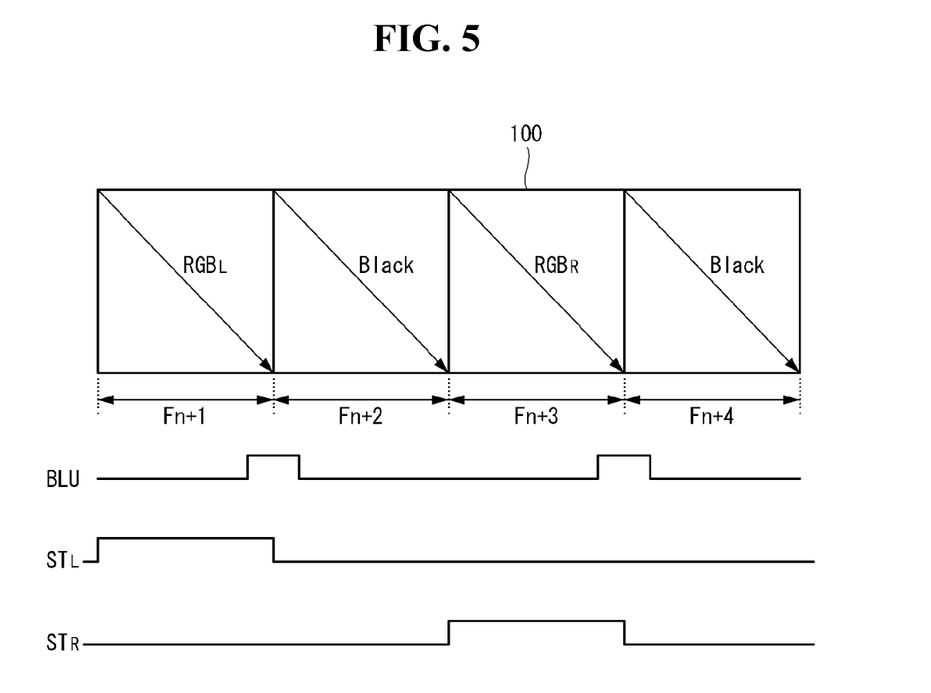
FIG. 5 is a waveform diagram illustrating a 3D mode driving method of the stereoscopic image display device according to the embodiment of this document.

Referring to FIGS. 4 and 5, a stereoscopic image display device according to an embodiment of the this document comprises a liquid crystal display panel 100, a backlight unit 200, a timing controller 101, a data driving circuit 102, a gate driving circuit 103, a host system 110, a frame rate conversion unit 112, a local dimming value selection unit 113, a backlight controller 114, a light source driving unit 117, a look-up table 118, and shutter glasses 130.

The liquid crystal display panel 100 is provided with a liquid crystal layer interposed between two glass substrates. The liquid crystal display panel comprises liquid crystal cells disposed at the intersections of data lines 105 and gate lines (or scan lines) 106 in a matrix.

The lower glass substrate of the liquid crystal display panel 100 is provided with a plurality of data lines 105 and a plurality of gate lines 106, TFTs (thin film transistors), and storage capacitors Cst. The liquid crystal cells of the liquid crystal display panel 100 are driven by pixel electrodes 1 connected to the TFTs and common electrodes 2 supplied with a common voltage. Black matrices, color filters, and the common electrodes are formed on the upper glass substrate of the liquid crystal display panel 100. Polarizers are respectively attached to the outer surfaces of the lower and upper glass substrate of the liquid crystal display panel 100, and alignment layers are formed on the inner surfaces having contact with the liquid crystal layer to set pretilt angles of the liquid crystal layer. The common electrodes are disposed on the upper glass substrate in a vertical electric field driving type such as a TN (twisted nematic) mode and a VA (vertical alignment) mode, and are disposed on the lower glass substrate along with the pixel electrodes in a horizontal electric field type such as an IPS (in plane switching) mode and an FFS (fringe field switching) mode. The liquid crystal display panel 100 may be implemented by a liquid crystal display panel of any other type as well as liquid crystal display panels of the TN mode, the VA mode, the IPS mode, and the FFS mode.

Figure 6:
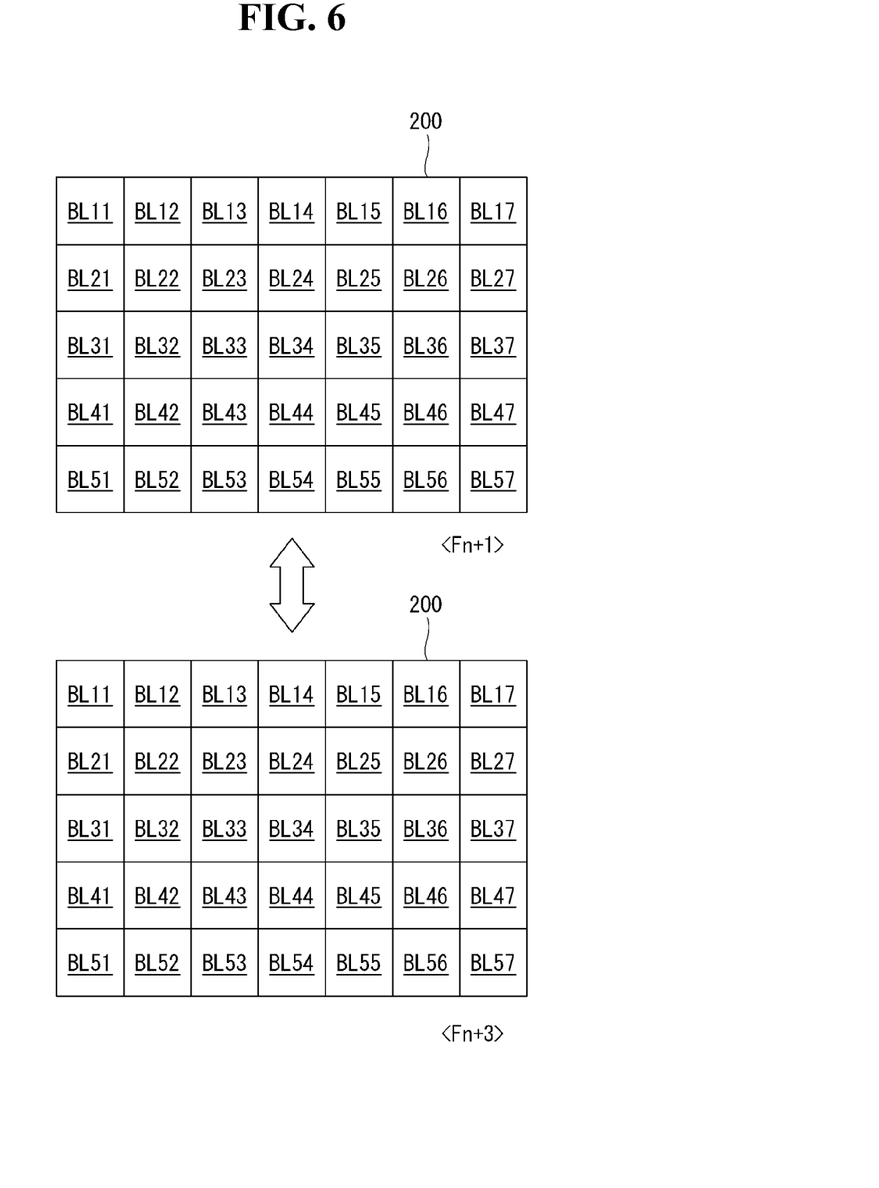
FIG. 6 is an exemplarily diagram illustrating local diming zones divided from a backlight unit.
Figure 7:
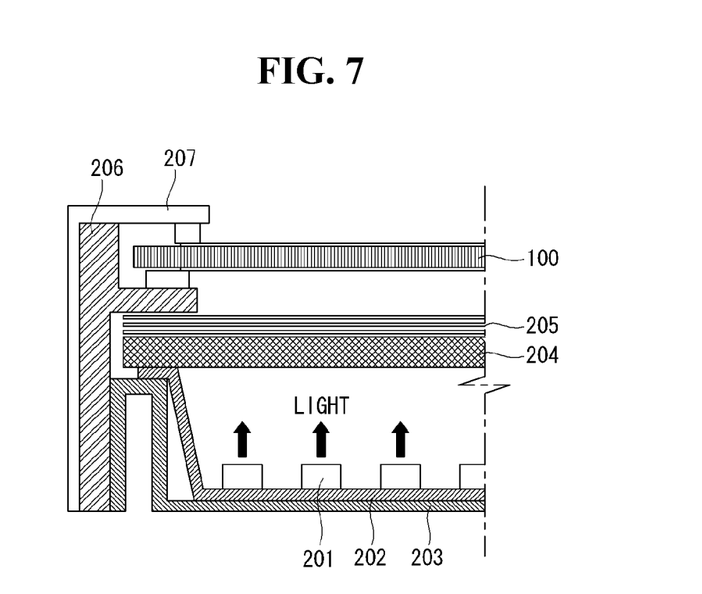
FIG. 7 is a sectional view illustrating an example of a direct type LED backlight unit.
Figure 8:
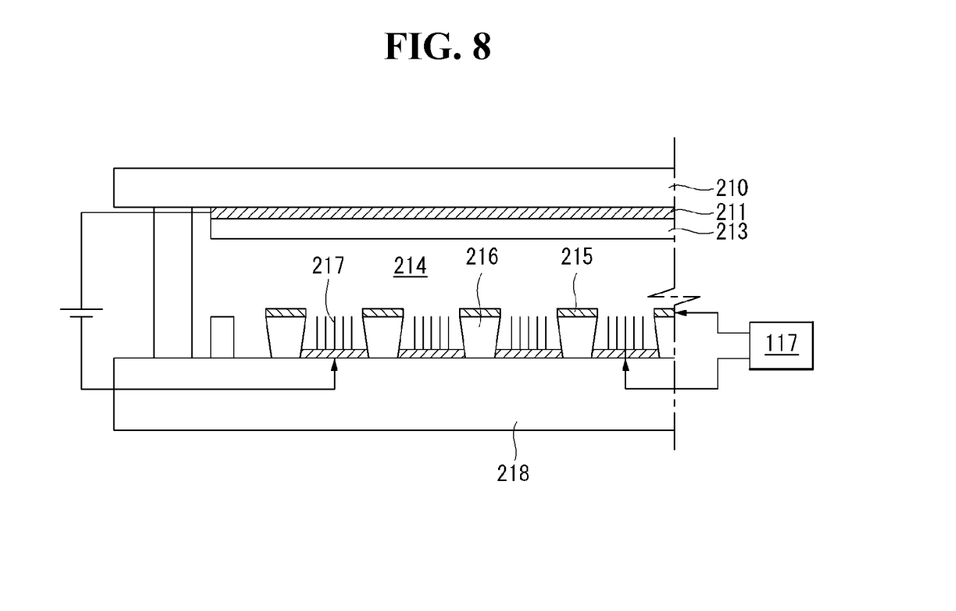
FIG. 8 is a sectional view illustrating an example of a field emission backlight unit.
Figure 9:
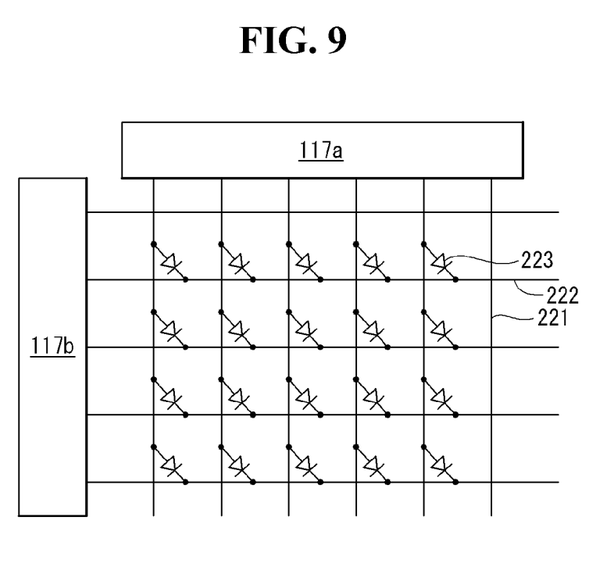
FIG. 9 is an equivalent circuit diagram illustrating an example of an OLED backlight unit.

The backlight unit 200 is implemented by a direct type backlight unit suitable for a local dimming. The direct type backlight unit may be implemented by a light emitting diode ("LED") backlight unit as shown in FIG. 7, a field emission backlight unit as shown in FIG. 8, and an organic light emitting diode ("OLED") backlight unit as shown in FIG. 9. Such a direct type backlight unit can control the brightness for each local dimming zone with pixel units or block units of the liquid crystal display panel. When the local dimming zone is set with block units, there is a division of a plurality of blocks where a display surface of the liquid crystal display panel 100 and an emission surface of the backlight unit 200 correspond to each other. If the resolution of the liquid crystal display panel 100 is assumed as M×N (where M indicates the number of pixels disposed in the transverse direction, and N indicates the number of pixels disposed in the longitudinal direction), a block has the size of i×j (where i is a positive integer ranging from 2 to M/10, and j is a positive integer ranging from 2 to M/10). Therefore, the single block has the size larger than one pixel and smaller than a display screen of the liquid crystal display panel 100. As shown in FIG. 6, for example, backlight unit 200 may be divided into the local dimming zones BL11 to BL57.

The timing controller 101 supplies digital video data RGB output from the frame rate conversion unit 112 to the data driving circuit 102. In addition, the timing controller 101 receives timing signals such as a vertical synchronizing signal Vsync, a horizontal synchronizing signal Hsync, a data enable signal DE, a dot clock CLK, from the host system 110 via the frame rate conversion unit 112, and generates timing control signals for controlling operation timings of the data driving circuit 102 and the gate driving circuit 103. The timing control signals include gate timing control signals for controlling operation timings of the gate driving circuit 103, and data timing control signals for controlling operation timings of the data driving circuit 102 and polarities of the data voltages.

The gate timing control signals include a gate start pulse GSP, gate shift clocks GSC, a gate output enable signal GOE, and so forth. The gate start pulse GSP is input to a gate drive IC, which constitutes the gate driving circuit 103, generating the first gate pulse and controls the gate drive IC to generate the first gate pulse. The gate shift clocks GSC are clock signals commonly input to the gate drive ICs and are used as clock signals for shifting the gate start pulse GSP. The gate output enable signal GOE controls output timings of the gate drive ICs.

The data timing control signals include a source start pulse SSP, a source sampling clock SSC, a polarity control signal POL, a source output enable signal SOE, and so on. The source start pulse SSP controls data sampling start timings in the data driving circuit 102. The source sampling clock SSC is a clock signal which controls data sampling timings with respect to a rising edge or a falling edge in the data driving circuit 102. The polarity control signal POL controls polarities of the data voltages output from the data driving circuit 102. The source output enable signal SOE controls output timings of the data driving circuit 102. If the digital video data to be input to the data driving circuit 102 is transmitted by a mini LVDS interface specification, the source start pulse SSP and the source sampling clock SSC may be omitted.

The timing controller 101 may change a 2D mode operation and a 3D mode operation based on a mode signal (not shown) output from the host system 110 via the frame rate conversion unit 112, or based on a mode identifying code encoded in an input image signal. The timing controller 101 may include an over-driving modulation circuit and perform an over-driving modulation for the digital video data RGB for 2D images output from the frame rate conversion unit 112 at the 2D mode, thereby transmitting it to the data driving circuit 102. The over-driving modulation circuit may receive previous frame data and current frame data and modulate the digital video data RGB by using a look-up table where a preset modulation value is output so as to improve the response characteristic of the liquid crystal.

The data driving circuit 102 latches the digital video data RGB, RGBL and RGBR for 2D or 3D images, and black grayscale data used during reset frame periods. The data driving circuit 102 converts the digital video data RGB, RGBL and RGBR for 2D or 3D images and the black grayscale data into gamma compensation voltages with positive and negative polarities in response to the polarity control signal POL, and reverses the polarities of the data voltages. The data driving circuit 102. Also, the data driving circuit 102 reverses the polarities of the data voltages output to the data lines 105 in response to the polarity control signal POL.

The gate driving circuit 103 sequentially supplies gate pulses (or scan pluses) to the gate lines 106 in response to the gate timing control signals.

The host system 110 supplies data for 2D images or 3D images and the timing signals Vsync, Hsync, DE and CLK to the timing controller 101 via an interface such as an LVDS (low voltage differential signaling) interface or a TMDS (transition minimized differential signaling) interface. The host system 110, at the 2D mode, supplies 2D images to the timing controller 101, and, at the 3D mode, supplies the digital video data RGBL and RGBR for 3D images constituted by left eye images and right eye images, to the timing controller 101. The host system 110 analyzes the image data, calculates a global dimming value according to a result of the analysis, and thereby generates a dimming signal in order to increase a contrast characteristic of a displayed image. The global dimming value is used to increase a dynamic contrast of 2D images or 3D images displayed in the liquid crystal display panel 100 by heightening a backlight dimming ratio in an entirely bright image and by lowering the backlight dimming ratio in a relatively dark image, through the analysis of input images. The global dimming value is a default dimming value when a local dimming is not performed.

The host system 110, at the 3D mode, selects data for left eye images as the former part data of one frame and data for right eye images as the latter part data thereof, to constitute one frame data for 3D images.

The host system 110 may change a 2D mode operation and a 3D mode operation in response to user data input via a user input device 111 (as shown in FIG. 4). The user input device 111 includes a touch screen attached to the liquid crystal display panel 100 or embedded therein, an on screen display (OSD), a keyboard, a mouse, a remote controller, and so on. Alternatively, the host system 110 may change the 2D mode operation and the 3D mode operation through a 2D and 3D identifying code encoded in the input image data. Alternatively, the host system 110 may generate a mode signal used to identify whether a current driving mode is the 2D mode or the 3D mode, and transmit it to the frame rate conversion unit 112.

The frame rate conversion unit 112 divides, at the 3D mode, the one frame data for 3D images into left eye image data and right eye image data, and expands each of the left eye image data and the right eye image data to one frame data. The frame rate conversion unit 112 reads black grayscale data stored in an internal register to generate a reset frame, and inserts the reset frame between a left eye frame and a right eye frame. All data for the reset frames is the black grayscale data, set in advance regardless of the input left eye and right eye image data, and stored in the internal register of the frame rate conversion unit 112. The black grayscale data is "00000000$_2$" when expressed by 8-bit digital data. As shown in FIG. 5, the data driving circuit 102 and the gate driving circuit 103 address the left eye image data RGBL in the liquid crystal display panel 100 during the (n+1)-th frame period Fn+1, and address the right eye image data RGBR in the liquid crystal display panel 100 during the (n+3)-th frame period Fn+3. During the (n+2)-th frame period and the (n+4)-th frame period, the black grayscale data are addressed in the in the liquid crystal display panel 100.

The frame rate conversion unit 112, at the 3D mode, generates the 3D image data by separating the left eye image data from the right eye image data input at the 3D mode and inserting the black data for the reset frame therebetween, and transmits the 3D image data to the timing controller 101 and the local dimming value selection unit 113 at a frame frequency which is four times the input frame frequency. If a frame frequency input to the frame rate conversion unit 112 is 50 Hz, a frame frequency output from the frame rate conversion unit 112 is 200 Hz, and if a frame frequency input to the frame rate conversion unit 112 is 60 Hz, a frame frequency output from the frame rate conversion unit 112 is 240 Hz. The input frame frequency is 50 Hz in the PAL (phase alternate line) scheme, and is 60 Hz in the NTSC (national television standards committee) scheme.

The frame rate conversion unit 112, at the 2D mode, inserts two pieces of frame data between adjacent two pieces of frame data for 2D images by a data frame interpolation method such as an MEMC (motion estimation motion compensation). Therefore, the frame rate conversion unit 112 transmits the data input at the 2D mode at the frame frequency four times higher than the input frame frequency.

The local dimming value selection unit 113 selects a local dimming value for each local dimming zone. The local dimming value may be a local dimming value for 2D images and a local dimming value for 3D images. At the 3D mode, the local dimming value selection unit 113 transmits pre-previous frame data and current frame data to the look-up table 118 for each local dimming zone BL11 to BL57 as shown in FIG. 6. The look-up table 118 outputs local dimming values for 3D images stored in addresses indicated by pre-previous frame data and current frame data, through the comparison of the pre-previous frame data and the current frame data to be displayed in the same local dimming zones as shown in FIG. 6. The local dimming values for 3D images are determined experimentally in consideration of a difference between pre-previous frame data and current frame data, and are a local dimming ratio used to adjust a ratio of turned-on to turned-off of the backlights during the current frame in order to reach a target brightness by pixel data for the current frame. Specifically, the look-up table 118 stores the local dimming values used to control brightness for the overall local dimming zones to the minimum during the reset frame periods (e.g., (n+2)-th and (n+4)-th frame periods as shown in FIG. 5), and local dimming values used to control brightness for each local dimming zone to target brightness for the left eye image data or the right eye image data during the left eye image frame periods and the right eye image frame periods (e.g., the (n+1)-th and (n+3)-th frame periods as shown in FIG. 5). The local dimming values output from the look-up table 118 are added to a global dimming value, to be transmitted to the backlight controller 114. Thereby, the local dimming value selection unit 113 selects local dimming values for the left eye image data or the right eye image data from the look-up table 118 for each local dimming zone and transmits them to the backlight controller 114 during the left eye image frame periods and the right eye image frame periods (e.g., the (n+1)-th and (n+3)-th frame periods as shown in FIG. 5). Further, the local dimming value selection unit 113 selects a minimum local dimming value from the look-up table 118 and transmits it to the backlight controller 114 during the reset frame periods (e.g., (n+2)-th and (n+4)-th frame periods as shown in FIG. 5). The local dimming value selection unit 113 inputs an average value of pixel data in each block as pre-previous frame data and current frame data, to the look-up table 118, when each of the local dimming zones BL11 to BL57 is selected to have the size equal to or larger than one pixel. The local dimming value selection unit 113 inputs pixel data itself as pre-previous frame data and current frame data to the look-up table 118, when each of the local dimming zones BL11 to BL57 is selected with pixel units having the size of one pixel.

The look-up table 118 may be divided into a 2D look-up table where local dimming values for 2D images are set and a 3D look-up table where local dimming values for 3D images are set. The 2D look-up table stores local dimming values for existing 2D images. The 3D look-up table receives the black data as the current frame data during the reset frame period, and stores the minimum local dimming value for controlling the brightness of the backlights to the minimum during the reset frame period by receiving black data of the pre-previous frame data.

The backlight controller 114 supplies, to the light source driving unit 117, backlight control data used to adjust the turned-on time of the light sources for each local dimming zone depending on the local diming values output from the local dimming value selection unit 113.

The backlight control data may be supplied to the light source driving unit 117 in a form of SPI (serial peripheral interface) data which includes PWM (pulse width modulation) duty ratio information, PWM rising timing information, and PWM falling timing information. The light source driving unit 117 adjusts a light source driving signal for the backlight unit 200 for each of the local dimming zones BL11 to BL57 in response to the backlight control data. The brightness for local dimming zones with high local dimming values is higher than the brightness for local dimming zones with low local dimming values because the local dimming zones with high local dimming values are higher than the local dimming zones with low local dimming values in the light source turned-on ratio of the backlight unit 200 during one frame period. The light source driving unit 117 may be implemented by an LED driving unit in the direct type LED backlight unit 200 shown in FIG. 7, by a gate driving unit in the field emission backlight unit 200 shown in FIG. 8, and by a column driving unit 117a and a row driving unit 117b in the OLED backlight unit 200 shown in FIG. 9.

The turned-on time of the backlight unit 200 includes the left eye and right eye frame periods Fn+1 and Fn+3 where the left eye (or right eye) image data RGBL and RGBR is addressed in the liquid crystal display panel 100 at the 3D mode. The backlight turned-on time is adjusted depending on a local dimming value (or PWM duty ratio) selected by the local dimming value selection unit 113. The turned-on time of the backlight unit 200 is controlled to be lengthened at the 3D mode more than at the 2D mode. For example, the backlight unit 200 is turned on during all the frame periods depending on the local dimming values on a basis of the global dimming value without the differentiation of frames since there are no reset frames at the 2D mode. At the 3D mode, the backlight unit 200 is turned off depending on the minimum local dimming value selected by the local dimming value selection unit 113 during the reset frame periods Fn+2 and Fn+4. The ratio of the turned-on to turned-off of the backlight unit 200 during one frame period is adjusted depending on a local dimming value for each local dimming zone selected by the local dimming value selection unit 113, on a basis of the global dimming value. For example, when target brightness (transmittance) for the local dimming zones of the liquid crystal display panel 100 is further increased due to the influence of the pre-previous frame data at the 3D mode, the backlight brightness for the associated local dimming zones is further reduced due to the local dimming value. In contrast, when target brightness (transmittance) for the local dimming zones of the liquid crystal display panel 100 is further reduced due to the influence of the pre-previous frame data at the 3D mode, the backlight brightness for the associated local dimming zones is further increased due to the local dimming value.

The shutter glasses 130 comprise a left eye shutter STL and a right eye shutter STR which are electrically controlled independently from each other. Each of the left eye shutter STL and the right eye shutter STR comprises a first transparent substrate, a first transparent electrode formed on the first transparent substrate, a second transparent substrate, a second transparent electrode formed on the second transparent substrate, and a liquid crystal layer interposed between the first and second transparent substrates. The first transparent electrode is applied with a reference voltage, and the second transparent electrode is applied with ON and Off voltages. Each of the left eye shutter STL and the right eye shutter STR transmits light from the liquid crystal display panel 100 when the ON voltage is applied to the second transparent electrode, whereas it blocks light from the liquid crystal display panel 100 when the OFF voltage is applied to the second transparent electrode. In order to alternately open and close the left eye shutter STL and the right eye shutter STR at the 3D mode, the host system 110 outputs a shutter control signal via a shutter control signal transmitter 120 (as shown in FIG. 4). The shutter control signal transmitter 120 transmits the shutter control signal to a shutter control signal receiver 121 (as shown in FIG. 4) via a wire or wireless interface. The shutter control signal receiver 121 may be embedded in the shutter glasses 130 or attached to the shutter glasses 130 by being manufactured as an independent module.

The shutter control signal receiver 121 receives the shutter control signal via a wired or wireless interface, and alternately opens and closes the left eye shutter STL and right eye shutter STR depending on the shutter control signal. When the shutter control signal having a first logic value is input to the shutter control signal receiver 121, the second transparent electrode of the left eye shutter STL is applied with the ON voltage, whereas the second transparent electrode of the right eye shutter STR is applied with the OFF voltage. When the shutter control signal having a second logic value is input to the shutter control signal receiver 121, the second transparent electrode of the left eye shutter STL is applied with the OFF voltage, whereas the second transparent electrode of the right eye shutter STR is applied with the ON voltage. Thus, the left eye shutter STL of the shutter glasses 130 is opened when the shutter control signal having the first logic value is generated, and the right eye shutter STR of the shutter glasses 130 is opened when the shutter control signal having the second logic value is generated.

The left eye shutter STL of the shutter glasses 130 is opened during the left eye frame period Fn+1 and the reset frame period Fn+2 subsequent thereto to transmit light for an left eye image, and is closed during the right eye frame period Fn+3 and the reset frame period Fn+4 subsequent thereto to block the light for the left eye image. The right eye shutter STR of the shutter glasses 130 is opened during the right eye frame period Fn+3 and the reset frame period Fn+4 subsequent thereto to transmit light for an right eye image, and is closed during the left eye frame period Fn+1 and the reset frame period Fn+2 subsequent thereto to block the light for the right eye image.

FIG. 7 is a diagram illustrating a first embodiment of the backlight unit 200.

In FIG. 7, the backlight unit 200 may be implemented by a direct type LED backlight unit. The direct type LED backlight unit comprises a plurality of LEDs 201 disposed under the liquid crystal display panel 100, a diffusion plate 204 disposed between the liquid crystal display panel 100 and the LEDs 201, and optical sheets 205. Each of the LEDs 201 may be a white LED. The white LED may be implemented by combination of three colors of a red LED, a green LED, and a blue LED, or by combination of a blue LED and a yellow phosphor. The optical sheets 205, constituted by one or more prism sheets, one or more diffusion sheets, and the like, diffuse light from the diffusion plate 204 and refract the light in a direction substantially perpendicular to the light incident plane of the liquid crystal display panel 100. A guide panel 206 covers the lateral sides of the liquid crystal display panel 100 and the direct type backlight unit, and supports the liquid crystal display panel 100 between the liquid crystal display panel 100 and the optical sheets 205. A bottom cover 203 covers the lower surface of the direct type backlight unit and supports the LEDs 201. A reflection sheet 202 is disposed on the inside of the bottom cover 203 where the LEDs 201 are disposed. A top case 207 covers the lateral sides of the liquid crystal display panel 100 and the guide panel 206.

FIG. 8 is a diagram illustrating a second embodiment of the backlight unit 200.

In FIG. 8, the backlight unit 200 may be implemented by a field emission backlight unit. The field emission backlight unit comprises an upper transparent substrate 210 provided with an anode electrode 211 and a white phosphor 213, and a lower transparent substrate provided with carbon nano-tubes (CNTs) 217 formed on a cathode electrode and gate electrodes 215. The upper transparent substrate 210 and the lower transparent substrate 210 are attached to each other by a Frit seal, and its inner space is air-tight at a vacuum of about $10^{-5}$ Torr and sealed in the vacuum state. High voltages are applied to the anode electrode 211 and the cathode electrode. The light source driving unit 117 applies a driving voltage to the gate electrodes 215 so as to emit electrons from the carbon nano-tubes 217. The gate electrodes 215 are formed on insulating patterns 216. The white phosphor 213 is excited and transited by the electrons to emit light.

FIG. 9 is a diagram illustrating a third embodiment of the backlight unit 200.

In FIG. 9, the backlight unit 200 may be implemented by an OLED backlight unit. The OLED backlight unit comprises column lines 221 and row lines 222 intersecting each other in a matrix, and OLEDs 223 arranged between the column lines 221 and the row lines 222. Each of the OLEDs 223 is constituted by an anode electrode connected to the column line 221, a cathode electrode connected to the row line 222, and a white OLED including a multi-layered organic compound layer disposed between the anode electrode and the cathode electrode. The organic compound layer comprises a hole injection layer (HIL), a hole transport layer (HTL), an emission layer (EML), an electron transport layer (ETL), and an electron injection layer (EIL). The column driving unit 117a supplies a backlight control data voltage determined by the dimming value from the local dimming value selection unit 113 to the column lines 221, and the row driving unit 117b sequentially supplies scan pulses synchronized with the backlight control data voltage to the row lines 222. The OLED backlight unit may be implemented by the passive type as shown in FIG. 9 or an active type (not shown). An active type OLED backlight unit may be provided with switch TFTs arranged between column lines and row lines, and driving TFTs which adjust currents flowing through OLEDs depending on voltages at the switch TFTs.

Figure 11:
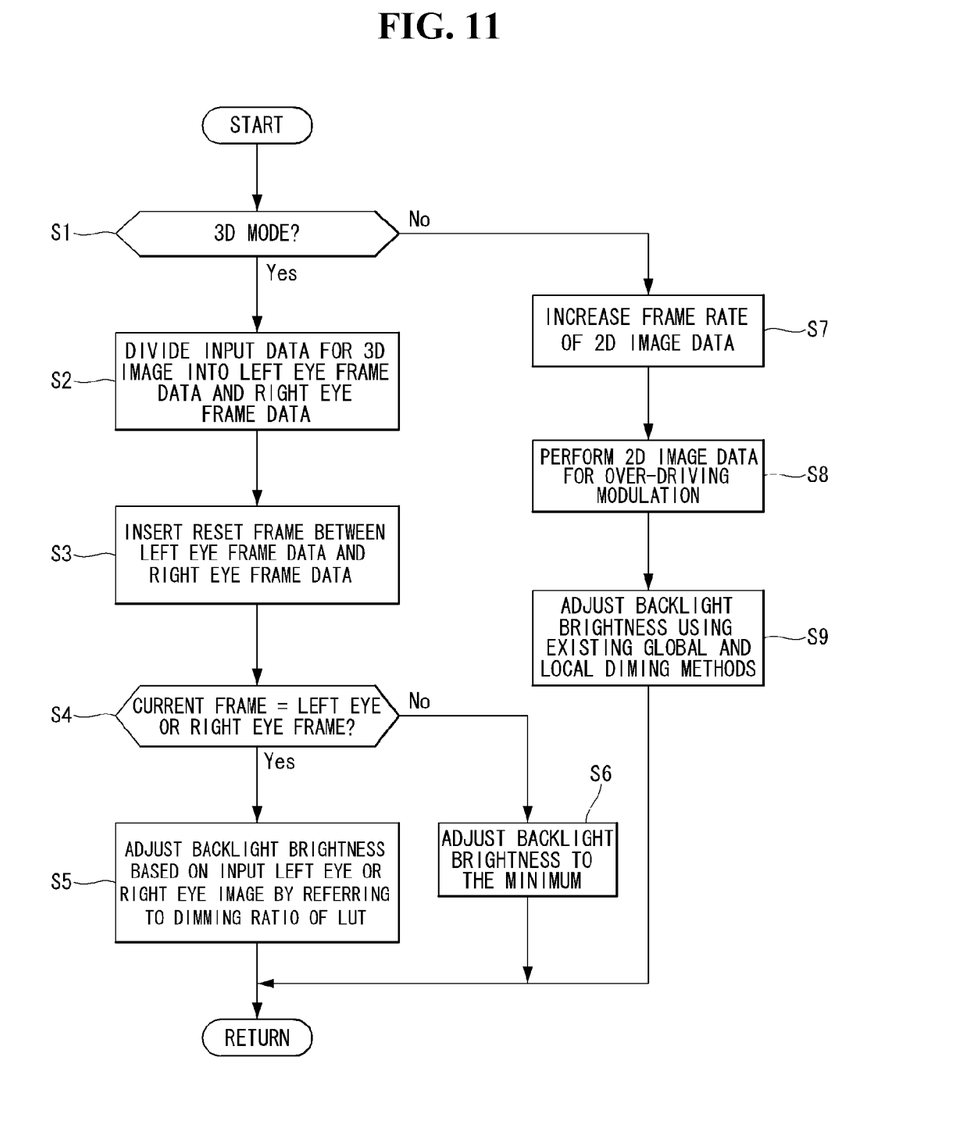
FIG. 11 is a flowchart illustrating a backlight control method of the stereoscopic image display device according to the embodiment of this document.

FIG. 11 is a flowchart illustrating a backlight control method of the stereoscopic image display device according to the embodiment of this document. The description of the driving method in FIG. 11 will be made along with the circuit blocks shown in FIG. 4.

Referring to FIG. 11, at step S1, it is determined whether a current driving mode is a 3D mode or a 2D mode. When it is determined that the current driving mode corresponds to the 3D mode, at steps S2 to S3, the frame rate conversion unit 112 divides the input data for 3D images into the left eye frame data and the right eye frame data, and inserts the reset frame data containing the black grayscale data between the left eye frame data and the right eye frame data.

At step S4, it is determined whether the current frame corresponds to the left eye frame data or the right eye frame data. If the current frame corresponds to the left eye frame data or the right eye frame data, at step S5, the local dimming value selection unit 113 receives the local dimming values dependent on left eye or right eye image data for the current frame from the look-up table 118, and controls the backlight brightness for each local dimming zone to target brightness for the left eye image data or the right eye image data depending on the local dimming values. On the other hand, when the current frame corresponds to the reset frame, at step S6, the local dimming value selection unit 113 receives the minimum local dimming value from the look-up table 118 and controls the backlight brightness for the overall local dimming zones to the minimum according to the minimum local dimming value.

When it is determined that the current driving mode corresponds to the 2D mode, at steps S7 and S8, the frame rate conversion unit 112 increases the frame rate of the input 2D image data by four times, and the timing controller 101 converts 2D image data into the over-driving modulation values. Then, at step S9, the local dimming value selection unit 113 selects dimming values using the existing global dimming and local dimming methods and controls the backlight brightness for each local dimming zone based on the dimming values.

Figure 10:
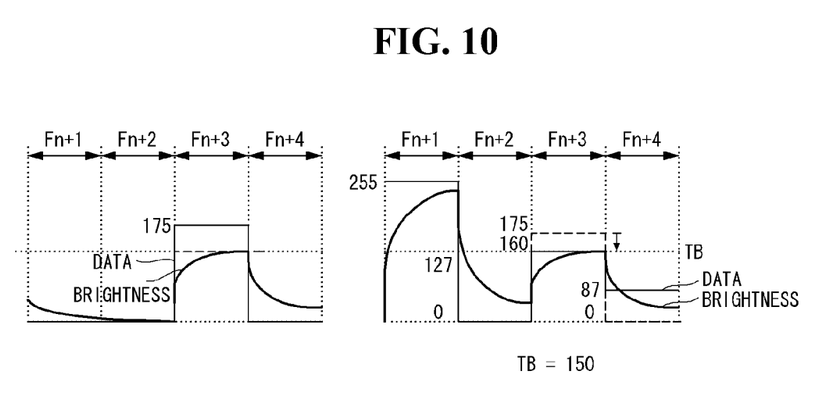
FIG. 10 is a diagram illustrating a backlight control method according to an embodiment of this document.

Now, the technical effects achieved by the backlight control method will be described with reference to FIGS. 3, 10. In the related art, as shown in the right part of FIG. 3, due to the influence of the pre-previous frame, the brightness during the reset frame period Fn+2 is increased to Di higher than the target brightness for the black grayscale data, and thereby brightness during the current frame Fn+3 is increased to be higher than the target brightness TB=150. In contrast, according to the present invention, even in the case where the target brightness to be reached during the (n+1)-th frame period Fn+1 is "255" as shown in a right part of FIG. 10, it is possible to control the brightness during the reset frame period Fn+2 to the minimum regardless of the pre-previous data, by minimizing the brightness during the reset frame period Fn+2, and it is possible to adjust brightness for the associated local dimming zones to the target brightness TB=150 during the current frame period by reducing the backlight brightness for the local dimming zones. In the same manner, according to the present invention, in the case of a left part of FIG. 10, it is possible to control the brightness during the reset frame period Fn+2 to the minimum regardless of the pre-previous data by minimizing the brightness during the reset frame period, and it is possible to adjust brightness for the associated local dimming zones to the target brightness TB=150 during the current frame period Fn+3 by reducing the backlight brightness for the local dimming zones. The brightness during the current frame period Fn+3 in 2 cases of FIG. 10 can be reached at the same target brightness TB=150. Therefore, according to the present invention, it is possible to minimize the 3D crosstalk in 3D images by controlling the backlight brightness to the target brightness for the local dimming zones regardless of the liquid crystal response delay characteristic during the pre-previous frame period or the reset frame period.

According to the present invention, as described above, it is possible to control the brightness during the reset frame period to the minimum regardless of the pre-previous data by minimizing the brightness during the reset frame period, and it is possible to adjust brightness for the associated local dimming zones to the target brightness by reducing the backlight brightness for the local dimming zones during the current frame period. Therefore, according to the present invention, it is possible to minimize the 3D crosstalk in 3D images by controlling the backlight brightness to the target brightness for the local dimming zones regardless of the liquid crystal delay characteristic during the pre-previous frame period or the reset frame period.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A stereoscopic image display device, comprising:
   a liquid crystal display panel having a plurality of gate lines, a plurality of data lines, and a plurality of pixels arranged at intersections of the gate lines and the data lines, and where frame data is addressed in an order of a (n+1)-th (where n is a positive integer) frame data to a (n+4)-th frame data;
   a backlight unit of which an emission surface is divided into local dimming zones which can be controlled in brightness and which provides light to the liquid crystal display panel, each local dimming zone corresponding to one or more pixels of the liquid crystal display panel;
   a frame rate conversion circuit configured to divide 3D input data into left eye image data and right eye image data, to insert reset frame data containing black grayscale data between the left eye image data and the right eye image data, and to thereby generate the (n+1)-th frame data containing the left eye image data, the (n+2)-th frame data containing the black grayscale data, the (n+3)-th frame data containing the right eye image data, and the (n+4)-th frame data containing the black grayscale data;
   a local dimming value selection circuit configured to receive the (n+1)-th to the (n+4)-th frame data from the frame rate conversion circuit, to select a local dimming value used to control brightness for the overall local dimming zones of the backlight unit to the minimum during the (n+2)-th and (n+4)-th frame periods regardless of a preceding frame data, and to select a local dimming value used to control brightness for each local dimming zone of the backlight unit to a respective target brightness for the left eye image data or the right eye image data during the (n+1)-th and (n+3)-th frame periods, wherein, for the (n+1)-th and (n+3)-th frame periods, when the brightness of a frame data of the local dimming zone two frames earlier is greater than the brightness of the current frame data of the local dimming zone, the local dimming value selection circuit selects the local dimming value of the associated local dimming zone to reduce the brightness of the local dimming zone and to reach the target brightness of a corresponding pixel data for the current frame, and when the brightness of the frame data of the local dimming zone two frames earlier is less than the brightness of the current frame data of the local dimming zone, the local dimming value selection circuit selects the local dimming value of the associated local dimming zone to increase the brightness of the local dimming zone and to reach the target brightness of the corresponding pixel data for the current frame; and a backlight controller configured to control light source brightness of each local dimming zone of the backlight unit, depending on the associated local dimming value output from the local dimming value selection circuit, wherein the local dimming zones are arranged in a plurality of columns and a plurality of rows, and wherein the left eye image data includes left eye RGB data, and the right eye image data includes right eye RGB data.

2. The stereoscopic image display device of claim 1, wherein each local dimming zone has the size of one pixel of the liquid crystal display panel.

3. The stereoscopic image display device of claim 1, wherein each local dimming zone has the size of a block larger than one pixel of the liquid crystal display panel and smaller than a display screen of the liquid crystal display panel.

4. The stereoscopic image display device of claim 1, further comprising a look-up table that stores the local dimming values.

5. The stereoscopic image display device of claim 4, wherein the look-up table stores the local dimming values in addresses indicated by the frame data two frames earlier and the current frame data, and the look-up table outputs local dimming values by comparing the frame data two frames earlier and the current frame data inputted from the local dimming value selection circuit.

6. The stereoscopic image display device of claim 5, wherein the local dimming value selection circuit is configured to input a respective average value of pixel data in each block corresponding to a respective local dimming zone, to the look-up table, as the frame data two frames earlier and the current frame data.

7. The stereoscopic image display device of claim 4, wherein, the look-up table is divided into a 2D look-up table for storing the local dimming values for 2D images and a 3D look-up table for storing the local dimming values for 3D images.

8. The stereoscopic image display device of claim 1, wherein the backlight controller is configured to adjust the ratio of the turned-on period to turned-off period of each local dimming zone of the backlight unit during one frame period depending on the associated local dimming value selected by the local dimming value selection circuit.

9. The stereoscopic image display device of claim 1, wherein, the backlight unit is turned off depending on the local dimming value selected by the local dimming value selection circuit during the (n+2)-th and (n+4)-th frame periods.

10. The stereoscopic image display device of claim 1, wherein the backlight unit is one of a direct type LED backlight unit, a field emission backlight unit and an OLED backlight unit.

11. The stereoscopic image display device of claim 1, further comprising shutter glasses having a left eye shutter which transmits light for an left eye image from the liquid crystal display panel and a right eye shutter which transmits light for a right eye image from the liquid crystal display panel.

12. A backlight control method of a stereoscopic image display device having a liquid crystal display panel with a plurality of pixels arranged in a matrix, and where frame data is addressed in an order of a (n+1)-th (where n is a positive integer) frame data to a (n+4)-th frame data, and a backlight unit of which an emission surface is divided into local dimming zones which can be controlled in brightness and which provides light to the liquid crystal display panel, the method comprising:

dividing 3D input data into left eye image data and right eye image data, inserting reset frame data containing black grayscale data between the left eye image data and the right eye image data, and thereby generating the (n+1)-th frame data containing the left eye image data, the (n+2)-th frame data containing the black grayscale data, the (n+3)-th frame data containing the right eye image data, and the (n+4)-th frame data containing the black grayscale data;

controlling brightness for the overall local dimming zones of the backlight unit to the minimum during the (n+2)-th and (n+4)-th frame periods regardless of a preceding frame data; and controlling brightness for each local dimming zone of the backlight unit to a respective target brightness for the left eye image data or the right eye image data during the (n+1)-th and (n+3)-th frame periods, wherein, when the brightness of a frame data of the local dimming zone two frames earlier is greater than the brightness of the current frame data of the local dimming zone, selecting the local dimming value of the associated local dimming zone to reduce the brightness of the local dimming zone and to reach the target brightness of a corresponding pixel data for the current frame, and when the brightness of the frame data of the local dimming zone two frames earlier is less than the brightness of the current frame data of the local dimming zone, selecting the local dimming value of the associated local dimming zone to increase the brightness of the local dimming zone and to reach the target brightness of the corresponding pixel data for the current frame, wherein the local dimming zones are arranged in a plurality of columns and a plurality of rows, and wherein the left eye image data includes left eye RGB data, and the right eye image data includes right eye RGB data.

13. The backlight control method of claim 12, wherein each local dimming zone has the size of one pixel of the liquid crystal display panel.

14. The backlight control method of claim 12, wherein each local dimming zone has the size of a block larger than one pixel of the liquid crystal display panel and smaller than a display screen of the liquid crystal display panel.

15. The stereoscopic image display device of claim 1, further comprising:
   a data driving circuit configured to output data voltages to the data lines; and
   an over-driving modulation circuit configured to receive input 2D image data from the frame rate conversion circuit and to output a modulation value based on the 2D image data to the data driving circuit, thereby improving the liquid crystal response characteristic.

16. The stereoscopic image display device of claim 5, wherein the local dimming value selection circuit is configured to add the local dimming values output from the lookup table to a global dimming value in selecting the local dimming values for the respective local dimming zones.

17. The backlight control method of claim 12, further comprising:
   storing local dimming values in a look-up table in addresses indicated by the frame data two frames earlier and the current frame data,
   wherein the controlling of brightness for each local dimming zone of the backlight unit to the respective target brightness includes outputting the local dimming values from the look-up table based on the frame data two frames earlier and the current frame data.

18. The backlight control method of claim 17, wherein the controlling of brightness for each local dimming zone of the backlight unit to the respective target brightness further includes adding the local dimming values output from the lookup table to a global dimming value to select the local dimming values for the respective local dimming zones.

* * * * *